United States Patent
Kofuji et al.

(10) Patent No.: US 8,051,963 B2
(45) Date of Patent: Nov. 8, 2011

(54) MOTORCYCLE

(75) Inventors: Kenji Kofuji, Saitama (JP); Shinichiro Ishida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 386 days.

(21) Appl. No.: 12/393,486

(22) Filed: Feb. 26, 2009

(65) Prior Publication Data

US 2009/0243377 A1    Oct. 1, 2009

(30) Foreign Application Priority Data

Mar. 27, 2008  (JP) ................. 2008-084935

(51) Int. Cl.
*F16D 65/14*  (2006.01)
(52) U.S. Cl. ...................... 188/352; 303/9.64
(58) Field of Classification Search ................. 188/345, 188/347, 349, 352, 358; 303/9.61–9.72
See application file for complete search history.

(56) References Cited

U.S. PATENT DOCUMENTS

| | | | | |
|---|---|---|---|---|
| 3,547,233 A | * | 12/1970 | Girvan | 188/170 |
| 3,789,961 A | * | 2/1974 | Warwick | 188/345 |
| 6,382,374 B1 | * | 5/2002 | Iwai et al. | 188/345 |
| 7,913,824 B2 | * | 3/2011 | Ishida et al. | 188/352 |
| 2007/0273200 A1 | * | 11/2007 | Pongo | 303/9.61 |
| 2008/0236961 A1 | * | 10/2008 | Toyoda | 188/106 R |

FOREIGN PATENT DOCUMENTS

JP        7-30800 B2    4/1995

* cited by examiner

*Primary Examiner* — Christopher Schwartz
(74) *Attorney, Agent, or Firm* — Birch, Stewart, Kolasch & Birch, LLP

(57) ABSTRACT

A motorcycle with a disk brake device and an anti-dip device for improving the external appearance of the front forks and for simplifying the fixing of the hoses. A single hose includes a hydraulic passage k extending from a secondary master cylinder and one end of the hose is connected to one opening of a three-way opening coupling fixed to the front forks. One end of a single hose is supported by the secondary master cylinder and the other end is supported by the three-way opening coupling. Thus the hose clamps may be omitted, the number of components is conspicuously reduced and the arrangement is simplified. In comparison to extending two hoses from the secondary master cylinder, only a single hose is extended according to the present invention. Thus, the handling of the hoses is simplified and the outer appearance near the front forks is improved.

20 Claims, 5 Drawing Sheets

MOTORCYCLE

CROSS-REFERENCE TO RELATED APPLICATIONS

The present application claims priority under 35 USC 119 to Japanese Patent Application No. 2008-084935 filed on Mar. 27, 2008 the entire contents of which are hereby incorporated by reference.

BACKGROUND OF THE INVENTION

1. Field of the Invention

The present invention relates to a motorcycle provided with a disk brake device and an anti-dive device.

2. Description of Background Art

A motorcycle is known that is provided with a disk brake device. See, for example, JP-B No. H7-30800, FIG. 1. In the following description hereafter, the reference numerals in brackets are the same as those shown in JP-B No. H7-30800.

A disk plate (3) is rotatably attached to an axle (2) on front forks (1). A primary caliper (5) and a secondary caliper (9) that cause a damping effect on a disk plate (3) are provided on the front forks (1).

A secondary master cylinder (10) is mounted on the primary caliper (5) and a push rod (13) of the secondary master cylinder (10) is connected to the front forks (1).

During braking, the primary caliper (5) swings clockwise in the figure. Thus the secondary master cylinder (10) advances forward and produces a hydraulic pressure. The hydraulic pressure is supplied to the secondary caliper (9) through a brake hose (15).

An anti-dive device is attached to the front forks (1) to mitigate the phenomenon of dipping of the front section of the vehicle body during braking.

Hydraulic pressure is also supplied to the anti-dive device from the secondary master cylinder (10).

Thus the hose from the secondary master cylinder (10) to the anti-dive device must branch from the hose (15) towards the secondary caliper (5). As a result, the plurality of hoses about the front forks (1) must be fixed using a complicated arrangement of hose clamps which adversely affects the external appearance near to the front forks (1).

Consequently there is a need for a structure which simplifies the fixing of the hoses and which improves the external appearance near to the front forks.

SUMMARY AND OBJECTS OF THE INVENTION

An object of an embodiment of the present invention is to provide a motorcycle with a disk brake device and an anti-dive device which simplifies the fixing of the hoses and which improves the external appearance near to the front forks.

According to an embodiment of the present invention, a motorcycle having a primary caliper is provided on a vehicle body to allow swing. A damping torque swings the primary caliper to produce a hydraulic pressure in a secondary master cylinder for supplying a part of the resulting hydraulic pressure to a secondary caliper and causing a damping action. The remainder of the hydraulic pressure is supplied to an anti-dive device provided on front forks and limiting a dip of a front section of the vehicle body, wherein the secondary master cylinder swings with the primary caliper and a tip of a hose extending from the secondary master cylinder is connected to an opening of a three-way opening coupling fixed to the front forks. The hydraulic pressure to the secondary caliper is supplied from another opening of the three-way opening coupling. The hydraulic pressure to the anti-dive device supplied from the remaining opening of the three-way opening coupling.

According to an embodiment of the present invention, the secondary master cylinder is integrally formed on a caliper bracket supporting the primary caliper and the caliper bracket is supported to swing to the lower end of the front fork in proximity to the axle.

According to an embodiment of the present invention, a hose extends from a secondary master cylinder. A tip of the hose is connected to an opening of a three-way opening coupling fixed to the front forks. An end of the hose is supported by a secondary master cylinder. The other end of the hose is supported by the three-way opening coupling. Thus, the hose clamps may be omitted. In this way, the number of components is conspicuously reduced and the arrangement is simplified.

In comparison to extending two hoses from the secondary master cylinder, only a single hose is extended according to the present invention, the handling of the hoses is simplified and the outer appearance near to the front forks is improved.

According to an embodiment of the present invention, the secondary master cylinder is integrally formed with the caliper bracket supporting the primary caliper. In comparison with using a bolt or the like in order to mount the secondary master cylinder onto the caliper bracket, the integral forming of the secondary master cylinder onto the caliper bracket in according with the present invention reduces the number of components and improves the outer appearance near to the front forks.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 shows arrangement of the primary caliper and the hoses and the like.

DETAILED DESCRIPTION OF THE PREFERRED EMBODIMENTS

The best mode for carrying out the invention will be described hereafter with reference to the attached figures. The dimensions "transverse and longitudinal" are determined by making reference to the position of a driver.

Figure 1:
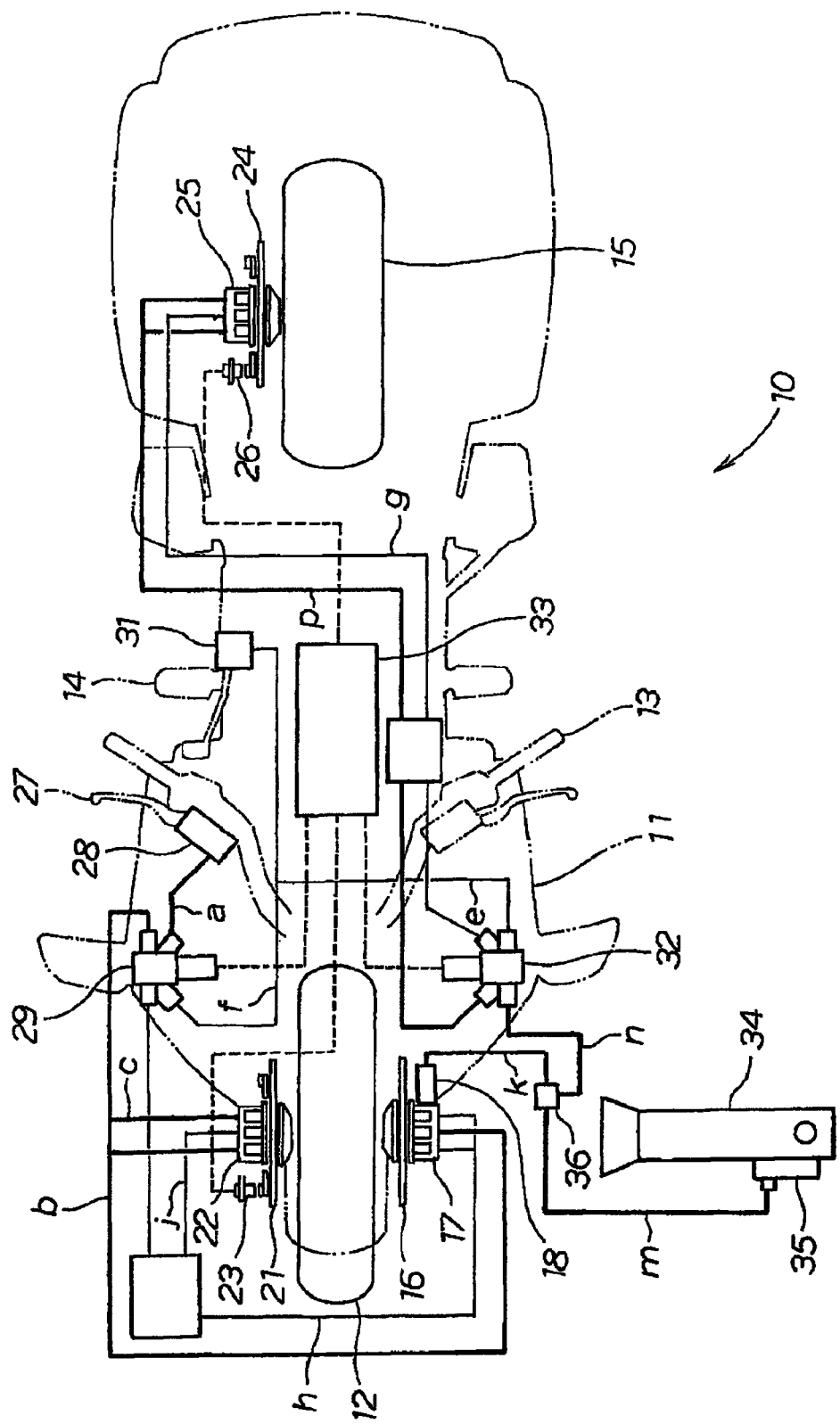
FIG. 1 shows a disk brake device for a motorcycle according to the present invention.

FIG. 1 shows a disk brake device for a motorcycle according to the present invention. The motorcycle 10 is provided with a front wheel 12 and handlebars 13 on a front section of the vehicle body 11 as shown by the outline, a brake pedal 14 is provided on the right side of the center section and a rear wheel 15 is provided on a rear section.

A first disk plate 16 is attached on the left side of the front wheel 12. A primary caliper 17 faces a first disk plate 16. A secondary master cylinder 18 is disposed in proximity to the primary caliper 17.

A second disk plate 21 is attached on the right side of the front wheel 12. A second caliper 22 faces the second disk plate 21. A front-wheel pulse pickup 23 is disposed to detect the rotational speed of the front wheel 12.

A third disk plate 24 is attached on the right side of the rear wheel 15. A secondary caliper 25 faces the third disk plate 24. A rear-wheel pulse pickup 26 is disposed to detect the rotational speed of the rear wheel 15.

The calipers 17, 22, 25 are each provided with three cylinders. The middle cylinder is termed the center cylinder with the remaining cylinders termed side cylinders.

When the brake lever 27 provided on the handlebars 13 is gripped, the hand brake master cylinder 28 develops a hydraulic pressure. This hydraulic pressure is transferred to the side cylinders of the second caliper 22 and the center cylinder of the primary caliper 17 via a hydraulic passage a, front modulator 29 and hydraulic passages b, c thereby creating a braking condition in the front wheel 12.

When the brake pedal 14 is depressed, a hydraulic pressure is produced by the foot brake master cylinder 31. This hydraulic pressure is supplied to the front modulator 29 and the rear modulator 32 via hydraulic passages e, f, transferred to the center cylinder of the secondary caliper 25 from the rear modulator 32 through a hydraulic passage g thereby creating a braking condition in the front wheel 12. In the same manner, the front wheel 12 is placed in a braking condition by transferring the hydraulic pressure from the front modulator 29 through hydraulic passages h, j to a side cylinder of the primary caliper 17 and a center cylinder of the second caliper 22.

The motorcycle 10 is also provided with an ABS (anti lock system). In other words, the rotational speed of the vehicle wheels is detected by a front-wheel pulse pickup 23 and a rear-wheel pulse pickup 26, a control unit 33 receiving the information detected by the pickups 23 and 26 controls a front modulator 29 to adjust the braking amount on the front wheel 12 and controls the rear modulator 29 to adjust the braking amount on the rear wheel to avoid producing a vehicle wheel lock phenomenon.

The motorcycle 10 is provided with an anti-dive device 35 on a lower section of the left front fork 34. The anti-dive device 35 plays a role of operating when the front wheel 12 is in a braking condition to limit the dip of the front section of the vehicle body.

The anti-dive device 35 receives a hydraulic pressure via hydraulic passages k, m from the secondary master cylinder 18. A part of the hydraulic pressure produced by the secondary master cylinder 18 is transferred to the side cylinders of the secondary caliper 25 via a hydraulic passage k, three-way opening coupling 36 and hydraulic passages n, p thereby creating a braking condition in the rear wheel 15.

The primary caliper 17, the second caliper 22 and the secondary caliper 25 may be formed from identical components. The structure of the primary caliper 17 will be described hereafter. Description of the structure of the second caliper 22 and the secondary caliper 25 will be omitted.

Figure 2:
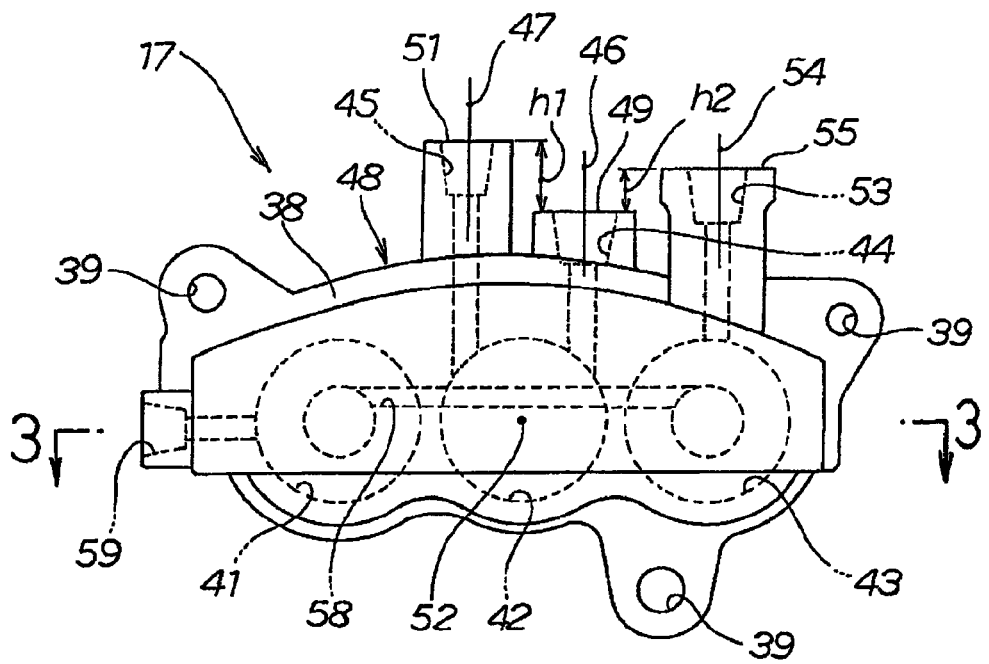
FIG. 2 is a front view of a caliper according to the present invention.

FIG. 2 is a front view of a caliper according to the present invention. In a caliper case 38 of a primary caliper 17, a plurality of bolts holes 39 are disposed on the edge and three cylinders comprising a front side cylinder 41, a center cylinder 42 and a rear side cylinder 43 are disposed in parallel.

A first hose connection opening 44 and a first air discharge opening 45 connected to the center cylinder 42 project from an outer face 48 of the caliper case 38 are in close proximity so that the axis 46 of the first hose connection opening and the axis 47 of the first air discharge opening are arranged in parallel.

In addition, a difference of elevation h1 is provided on both tip end faces 49, 51 so that the tip end face 51 of the first air discharge opening 45 is higher than the tip end face 49 of the first hose connection opening 44. The height is determined in reference to the height from the center 52 of the center cylinder 42.

Preferably, the second hose connection opening 53 connected to the rear side cylinder 43 is provided to project from near to the outer face 48 of the caliper case 38 so that the axis 54 of the second hose connection opening is parallel to the axis 46 of the first hose connection opening. A difference of elevation h2 is provided on both tip end faces 49, 55 so that the tip end face 55 of the second air discharge opening is higher than the tip end face 49 of the first hose connection opening 44.

Figure 3:
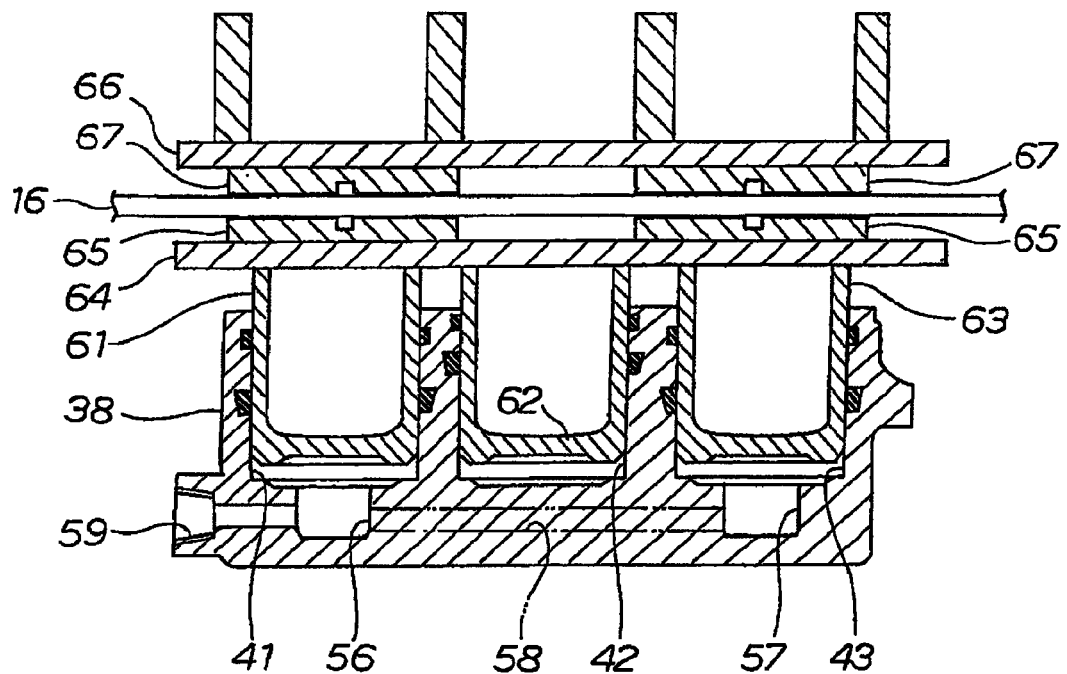
FIG. 3 is a sectional view along the line 3-3 in FIG. 2.

FIG. 3 is a sectional view along the line 3-3 in FIG. 2. A recess 56 is provided in the back of the front side cylinder 41 and a recess 57 is provided in the back of a rear side cylinder 43. A connection passage 58 connects the recesses 56, 57. The second air discharge opening 59 which discharges air from the connection passage 58 is disposed forward of the rear side cylinder 41.

A brake pad 64 is pressed by pistons 61, 63 engaged in both side cylinders 41, 43. A lining 65, 65 attached to the brake pad 64 is pressed onto a first disk plate 16.

A braking effect is applied to the first disk plate 16 by sandwiching the disk plate 16 with another lining 67, 67 attached to the brake pad 66 and the front lining 65, 65.

A braking effect is applied to the first disk plate 16 even when the brake pad 64 is pressed by the piston 62 engaged with the center cylinder 42.

Figure 4:
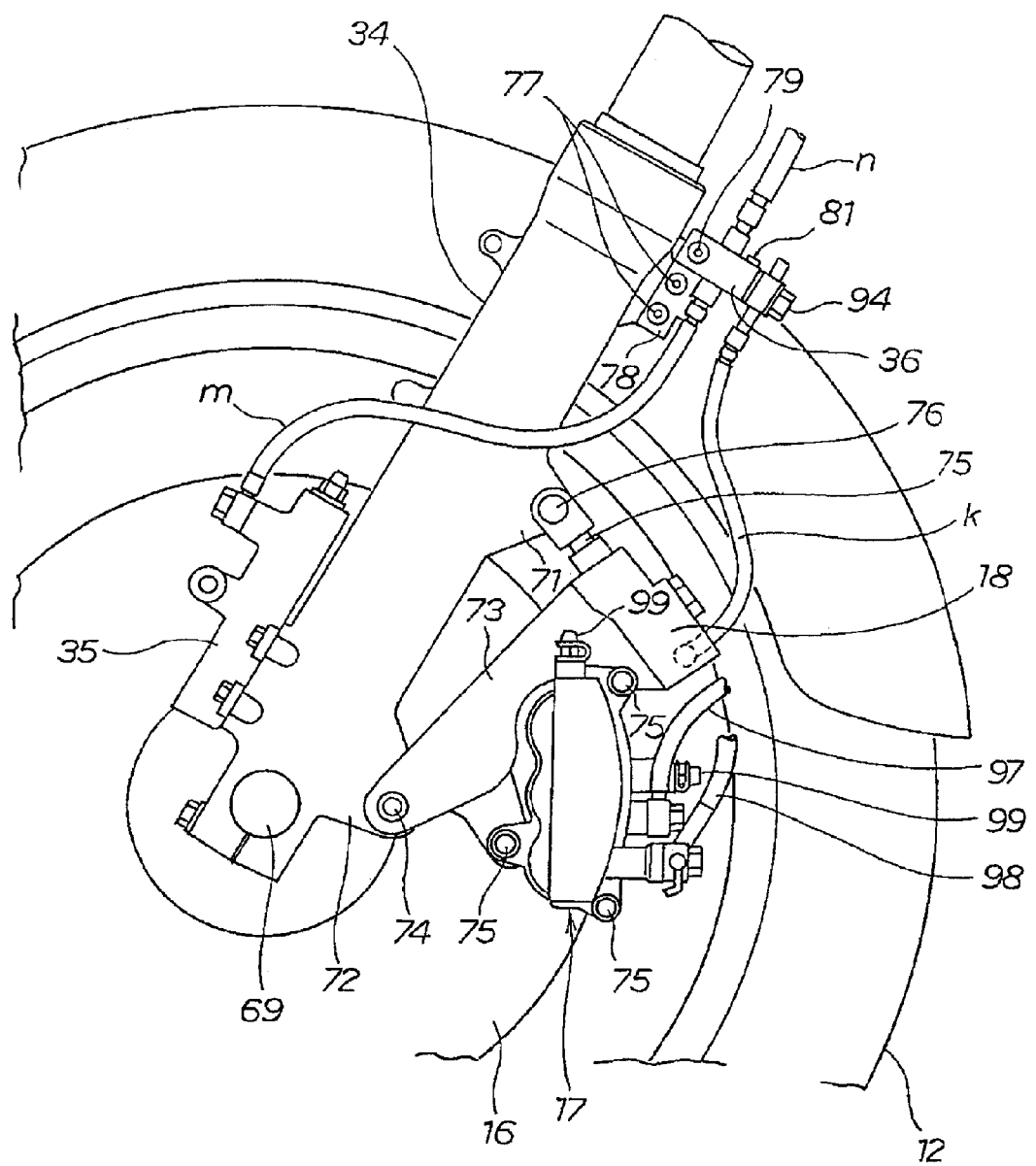
FIG. 4 is a left view of a front wheel.

FIG. 4 is a left view of a front wheel. A projecting section 71, 72 which overhangs rearwardly is integrally formed on the lower end of the front fork 34. A lower end of the caliper bracket 73 supporting the primary caliper 17 is pivotally supported on the projecting section 72 in proximity to the axle 69 at a low position. The caliper bracket 73 is mounted to swing in a longitudinal direction (right and left in the figure) about a pin 74.

The primary caliper 17 is fixed for example by three bolts 75 to the caliper bracket 73. A secondary master cylinder 18 is integrally formed to the upper section of the caliper bracket 73. A plunger shaft 75 extending from the secondary master cylinder 18 is connected by a pin 76 to the projecting section 71 near to the front fork 34.

In FIG. 4, when a braking force is applied to the primary caliper 17, braking torque swings the primary caliper 17 about the pin 74 in an anticlockwise direction in FIG. 4 to the first brake plate 16 which is rotating in an anticlockwise direction. The plunger shaft 75 displaces in a compressing direction and produces a hydraulic pressure.

The hydraulic pressure is supplied to the three-way opening coupling 36 through a hose forming a hydraulic passage k. The inner structure of the three-way opening coupling 36 will be described hereinafter.

A holder 78 is fixed by bolts 77, 77 to the front forks 34. The three-way opening coupling 36 is mounted in the holder 78 by a bolt 79. The holder 78 is provided with an engaging claw 81 which prevents rotation. Consequently the three-way opening coupling 36 can be fixed using only one bolt 79.

A portion of the hydraulic pressure from the three-way opening coupling 36 is supplied to the anti-dive device 35 through a hose forming a hydraulic passage m. The remainder of the hydraulic pressure is supplied to the outside through a hose forming a hydraulic passage n. The passages k, m, n are shown in FIG. 1.

In other words, a hose forming a hydraulic passage k extends from the secondary master cylinder 18. The tip of the hose is connected to an opening of the three-way opening coupling 36 fixed to the front forks 34. One end of the hose (lower end) is supported by the secondary master cylinder 18 and the other end (upper end) is supported by the three-way opening coupling 36. Thus the hose clamps may be omitted, the number of components is conspicuously reduced and the arrangement is simplified.

In comparison to extending two hoses from the secondary master cylinder 18, only a single hose is extended according to the present invention, the handling of the hoses is simplified and the outer appearance near to the front forks is improved.

The secondary master cylinder 18 is integrally formed with the caliper bracket 73 supporting the primary caliper 17.

In comparison with using a bolt or the like in order to mount the secondary master cylinder onto the caliper bracket, the integral forming of the secondary master cylinder 18 onto the caliper bracket 73 in according with the present invention reduces the number of components and improves the outer appearance near to the front forks.

Figure 5:
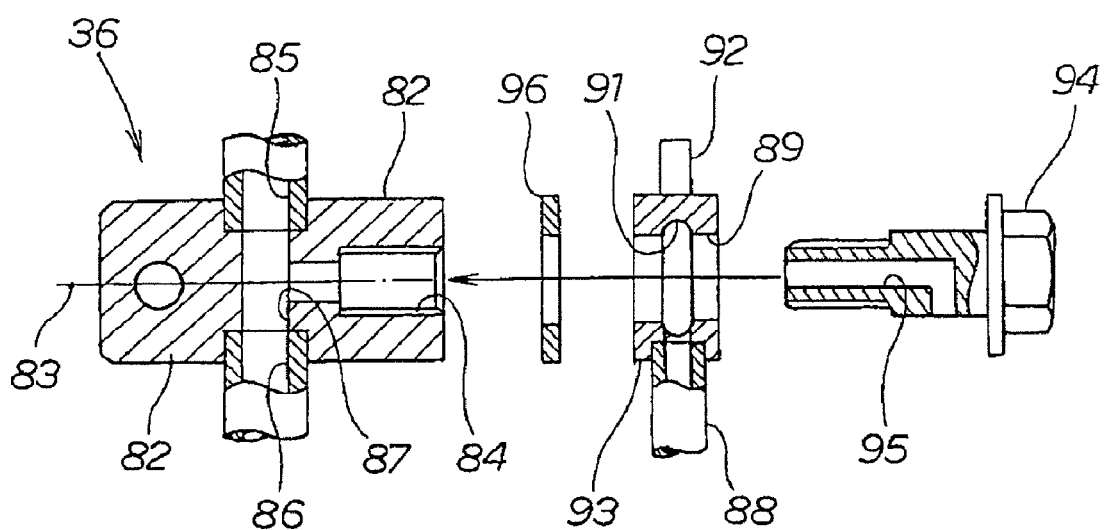
FIG. 5 is a sectional view of the three-way opening coupling.

FIG. 5 is a sectional view of the three-way opening coupling. The three-way opening coupling 36 has a first opening 84 provided along the long axis 83 of a prism-shaped block 82. A second opening 85 is provided orthogonally to the long axis 83. A third opening 86 is provided symmetrically to the second opening 85. The three openings 84, 85, 86 form a coupling which is connected by a T-shaped passage 87.

A mouthpiece 93 is provided on one end of the hose 88 connected to the first opening 84. The mouthpiece 93 is provided with a bolt hole 89, an annular groove 91 and a projection 92. An L-shaped passage 95 is provided in a designated bolt 94.

The designated bolt 94 is screwed into the first opening 84 of the three-way opening coupling 36 through a seat ring 96 to the mouthpiece 93. At this time, if the projection 92 is restrained using a normal tool such as a nipper, the mouthpiece 93 will not rotate together with the designated bolt 94 and the process of threadable engagement can be performed smoothly.

This operation completes the connection of the hose 88.

After completion, a hydraulic pressure supplied by the hose 88 is supplied to the second opening 85 and the third opening 86 through the annular groove 91, the L-shaped passage 95 and the T-shaped passage 87.

Figure 6:
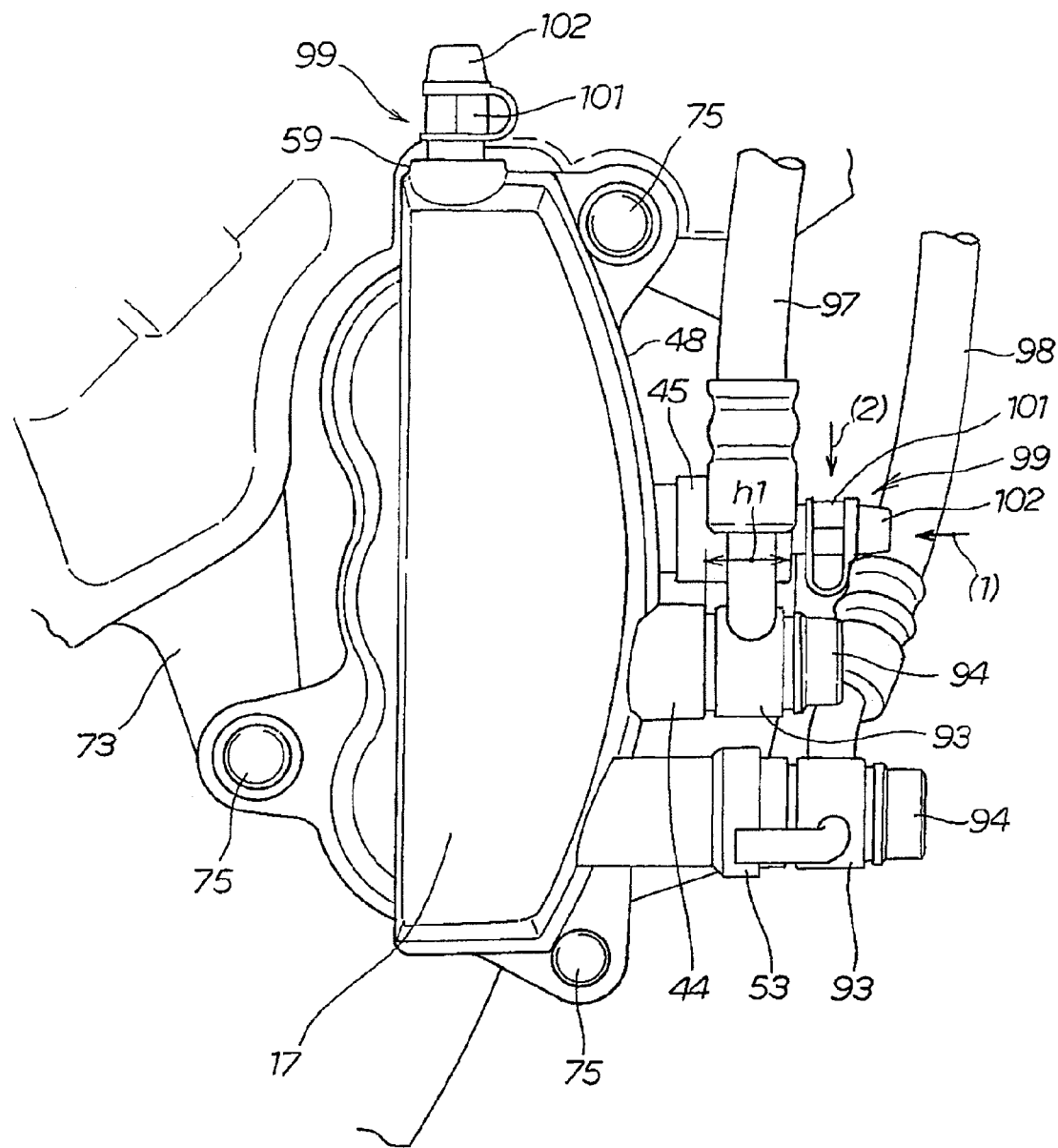

FIG. 6 shows an arrangement of the primary caliper and the hoses and the like. The mouthpiece 93 of the first brake hose 97 is connected using a designated bolt 94 to the first hose connection opening 44. The mouthpiece 93 of the second brake hose 98 is connected using a designated bolt 94 to the adjacent second hose connection opening 53. An air valve 99 which closes when tightened and opens when loosened is threadably engaged with the opposite adjacent first air discharge opening 45.

The tip of the first air discharge opening projects by a distance h1 to a higher position than the tip of the first hose connection opening 44. The first brake hose 97 extends along the outer face 48 of the primary caliper 17.

When the difference in the elevation h1 is substantially equal to the thickness of the mouthpiece 93, as shown in the FIG. 6, a tool engagement section 101 can be seen directly from the side of the vehicle body.

When discharging air, a resin cap 102 is removed, a tool is applied to the tool engagement section 101, and rotated so as to place the valve in an open position.

The tool may be a normal tool such as a box wrench, spectacle wrench or a spanner. In other words, a box wrench or spectacle wrench may be engaged with the tool engagement section 101 as shown by the arrow (1). When a spanner is used, it is engaged with the tool engagement section 101 as shown by the arrow (2). In either case, the first brake hose 97 is not an obstacle.

Since the tool engagement section 101 is higher than the first brake hose 97, even when the tool engaged with the tool engagement section 101 swings, the first brake hose 97 is not an obstacle thus allowing simple opening and closing operations of the air valve 99 and simple handling of the resin cap 102.

When the tool engagement section 101 is formed with a polygonal sectional face, the tool can be engaged. However since normal tools are typically adapted for use with hexagonal bolts, the shape of the tool engagement section 101 preferably has a hexagonal sectional face.

The second air discharge opening 59 is mounted facing upwardly or may be inclining upwardly. In this manner, air can be rapidly discharged.

In this aspect, a secondary caliper is disposed in proximity to the rear wheel. However it can be disposed on the right of the front wheel. Thus the disposition of the secondary caliper is arbitrary.

This invention is applied to a motorcycle provided with a disk brake device and an anti-dive device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle having a primary caliper provided on a vehicle body to allow swing, a damping torque swings the primary caliper to produce a hydraulic pressure in a master cylinder adjacent to the primary caliper for supplying a part of the resulting hydraulic pressure to a secondary caliper and causing a damping action, a remainder of the hydraulic pressure is supplied to an anti-dive device provided on one of a pair of front forks for limiting a dip of a front section of the vehicle body;

wherein the master cylinder swings integrally with the primary caliper and a tip of a hose extending from the master cylinder is connected to a first opening of a three-way opening coupling fixed to one of the front forks, the hydraulic pressure to the secondary caliper is supplied from a second opening of the three-way opening coupling, and the hydraulic pressure to the anti-dive device is supplied from a third opening of the three-way opening coupling.

2. The motorcycle according to claim 1, wherein the master cylinder is integrally formed on a caliper bracket supporting the primary caliper, the caliper bracket supported to be pivotally mounted relative to a lower end of one of the front forks in proximity to the axle.

3. The motorcycle according to claim 2, wherein the caliper bracket is pivotally supported at a first end on one of the front forks to swing in a longitudinal direction relative to the vehicle body.

4. The motorcycle according to claim 3, wherein when a braking force is supplied to the primary caliper, braking torque swings the primary caliper about the pivotally support for displacing a plunger shaft operatively connected to a second end of the caliper bracket for generating hydraulic pressure supplied to the first opening of the three-way opening coupling.

5. The motorcycle according to claim 1, wherein the first opening is in communication with a first passageway extending along an axis of the three-way coupling, the second opening is in communication with a second passageway provided orthogonally to the first passageway and the third opening is in communication with a third passageway symmetrically disposed relative to the second opening, wherein the first, second and third passageways form a substantially T-shape passageway.

6. The motorcycle according to claim 5, and further including a mouthpiece operatively connected to the first opening, said mouthpiece including a bolt aperture for receiving a bolt for securing the mouthpiece relative to the three-way opening coupling.

7. The motorcycle according to claim 6, wherein the bolt includes a substantially L-shaped passageway for supplying hydraulic pressure from the hose extending from the master cylinder to the first opening of the three-way opening coupling.

8. The motorcycle according to claim 1, wherein the primary caliper is operatively connected to a front fork of the motorcycle.

9. The motorcycle according to claim 1, wherein the secondary caliper is operatively connected to a rear frame of the motorcycle.

10. The motorcycle according to claim 1, wherein the anti-dive device is positioned on a lower section of one of the front forks for limiting the dip of the front section of the vehicle body.

11. A primary caliper for use on a vehicle body comprising:
front forks for supporting a front wheel of the vehicle body;
said primary caliper being pivotally mounted relative to one of the front forks, a damping torque applied to said primary caliper pivots the primary caliper for producing a hydraulic pressure in a master cylinder adjacent to the primary caliper for supplying a part of the resulting hydraulic pressure to a secondary caliper and causing a damping action, a remainder of the hydraulic pressure is supplied to an anti-dive device provided on one of the front forks for limiting a dip of a front section of the vehicle body;
said master cylinder swings integrally with the primary caliper;
a tip of a hose extending from the master cylinder is connected to a first opening of a three-way opening coupling fixed to one of the front forks;
the hydraulic pressure to the secondary caliper is supplied from a second opening of the three-way opening coupling; and
the hydraulic pressure to the anti-dive device is supplied from a third opening of the three-way opening coupling.

12. The primary caliper according to claim 11, wherein the master cylinder is integrally formed on a caliper bracket supporting the primary caliper, the caliper bracket supported to be pivotally mounted relative to a lower end of one of the front forks in proximity to the axle.

13. The primary caliper according to claim 12, wherein the caliper bracket is pivotally supported at a first end on one of the front forks to swing in a longitudinal direction relative to the vehicle body.

14. The primary caliper according to claim 13, wherein when a braking force is supplied to the primary caliper, braking torque swings the primary caliper about the pivotally support for displacing a plunger shaft operatively connected to a second end of the caliper bracket for generating hydraulic pressure supplied to the first opening of the three-way opening coupling.

15. The primary caliper according to claim 11, wherein the first opening is in communication with a first passageway extending along an axis of the three-way coupling, the second opening is in communication with a second passageway provided orthogonally to the first passageway and the third opening is in communication with a third passageway symmetrically disposed relative to the second opening, wherein the first, second and third passageways form a substantially T-shape passageway.

16. The primary caliper according to claim 15, and further including a mouthpiece operatively connected to the first opening, said mouthpiece including a bolt aperture for receiving a bolt for securing the mouthpiece relative to the three-way opening coupling.

17. The primary caliper according to claim 16, wherein the bolt includes a substantially L-shaped passageway for supplying hydraulic pressure from the hose extending from the master cylinder to the first opening of the three-way opening coupling.

18. The primary caliper according to claim 11, wherein the primary caliper is operatively connected to a front fork of the vehicle body.

19. The primary caliper according to claim 11, wherein the secondary caliper is operatively connected to a rear frame of the vehicle body.

20. The primary caliper according to claim 11, wherein the anti-dive device is positioned on a lower section of one of the front forks for limiting the dip of the front section of the vehicle body.

* * * * *